United States Patent [19]

Beehler et al.

[11] Patent Number: 4,696,357
[45] Date of Patent: Sep. 29, 1987

[54] PACKER/WEIGH-SCALE

[75] Inventors: David E. Beehler; Timothy E. Drake; Timothy E. Hawk, all of Westfield, N.Y.

[73] Assignee: Renold, Inc., Westfield, N.Y.

[21] Appl. No.: 867,148

[22] Filed: May 27, 1986

[51] Int. Cl.[4] .................... G01G 19/00; G01G 21/10
[52] U.S. Cl. .................................. 177/145; 177/184; 177/DIG. 11
[58] Field of Search ........ 177/255, DIG. 9, DIG. 11, 177/145, 184

[56] References Cited
U.S. PATENT DOCUMENTS 3,805,905  4/1974  McClusky ................. 177/DIG. 11
4,027,735  6/1977  Floyd ........................ 177/DIG. 11

Primary Examiner—George H. Miller, Jr.
Attorney, Agent, or Firm—Charles L. Lovercheck; Wayne L. Lovercheck; Dale R. Lovercheck

[57] ABSTRACT

A container filler and weighing system is disclosed. The weighing system is made up of a scale with a support for a container supported on the scale. A vibrator connected to the support so that the material fed into the container from a feeder is packed and settled in the container. An electronic readout is connected to the scale and a digital readout connected to the electronic circuit whereby the readings can be recorded and an annunciator is connected to the electronic circuit to signal when the container is full. The vibrator connected to the container support delivers a vertical component of force that has an especially good and efficient packing reaction on the material in the container.

8 Claims, 9 Drawing Figures

PACKER/WEIGH-SCALE

GENERAL STATEMENT OF THE INVENTION

The packer/weigh-scale exhibits a combination of features which are necessary to make such a device workable as well as unique and accurate. The packer design employs a vibrator, or vibrators, which essentially produces a straight line force in the vertical plane only. Horizontal forces are minimal. The construction of the scale is such that it can "ignore" horizontal force vectors and horizontal displacements of the scale platform, provided that these forces and/or displacements are small. The combination of the packer design and construction of the scale makes for a workable machine which does not require special counterbalance masses, or special physical stops or auxiliary springs or any other extraordinary measures to limit force or motion. The disclosed structure allows weighing while packing.

The load is applied to four load cells in such a manner that the force vector is directed downward at all times. This is accomplished by supporting the load on cables or chain suspension elements. The suspension system of the packer is designed such that no negative force vector is present. The software contained in the scale indicator circuitry has "filtering" capabilities to stabilize the indicator readings.

The electronic hardware/software package (which is essentially a "modern day standard" offering familiar to those skilled in the art) utilizes high speed averaging to produce a steady indicator read-out. Filtering capabilities are built-in to the electronic circuit. A packer and weigh scale for concurrent use became viable only after such integrated circuitry was developed. Roller conveyor track is but one of several options available. It may not be used on many applications.

REFERENCE TO PRIOR ART

Vibratory packers have been utilized for years to settle and/or compact bulk materials in cartons, boxes, drums and containers prior to storage and/or transport. The economic basis for use of such devices includes increased product unit net weight reduced packaging costs, and increased package strength due to higher density of contents. This allows stacking of containers. Scales have been incorporated into packer installations for the express purpose of measuring the weight of container contents. Typically, the scale is installed in such a way that the vibratory action of the packer can be mechanically isolated from the scale. The operating sequence for such a packer/weigh-scale combination is as follows: (1) Fill container and weigh. (2) Isolate from scale. (3) Pack. (4) Repeat until desired container net weight is achieved.

U.S. Pat. No. 3,805,905 discloses a vibrating means to oscillate the container in a weighing system. The vibrator is intended to vibrate the container in a horizontal plane to settle the bulk material in the container. It has been discovered that by providing a vibrator which vibrates the container in a vertical plane only, a superior packing reaction as well as an accurate weight can be obtained.

OBJECTS OF THE INVENTION

It is an object of the invention to provide an improved combination vibrator and weigher system.

Another object of the invention is to provide a packer/weigher system that is simple in construction, economical to manufacture and simple and efficient to use.

Another object of the invention is to provide a vibrator packer and weigh scale that will weigh accurately while packing.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWINGS

Figure 1:
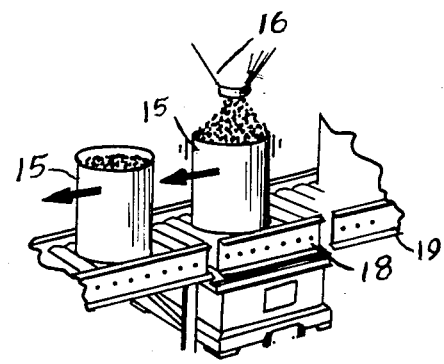
FIG. 1 an isometric view of a packer/weigh-scale according to the invention shown as in use.
Figure 6:
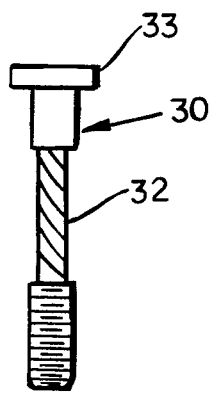
FIG. 6 is an enlarged view of a suspension member cable used to suspend the scale.
Figure 2:
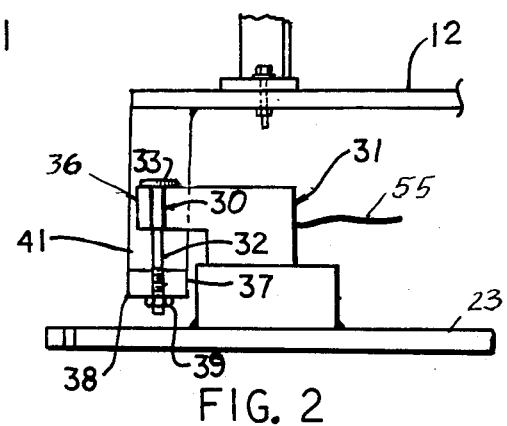
FIG. 2 is an enlarged front view of the load cell arrangement with one leg of the yoke removed.
Figures 3, 9:
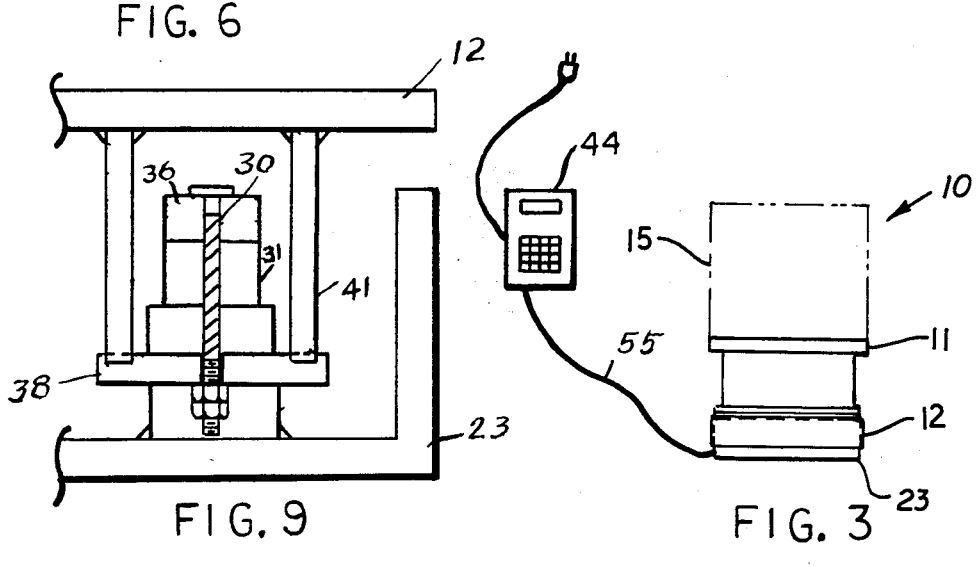
FIG. 3 is a block diagram of the packer/weigh-scale according to the invention.
FIG. 9 is an enlarged side view of a load cell arrangement similar to FIG. 2
Figure 4:
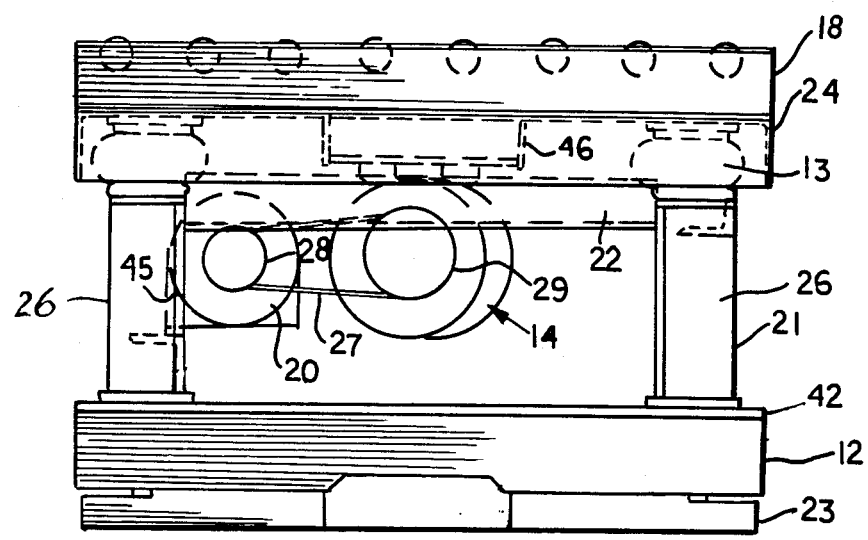
FIG. 4 is a partial side view of the packer/weigh-scale.
Figure 5:
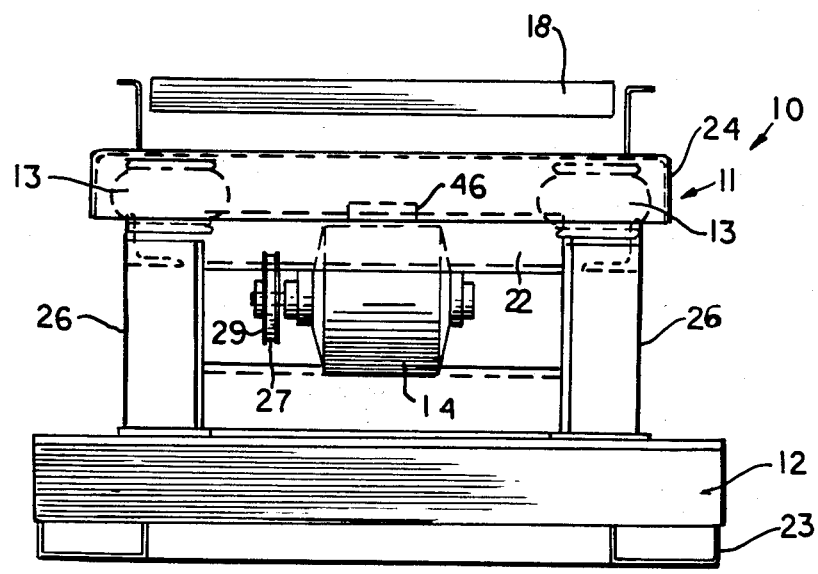
FIG. 5 is a right end view of the packer/weigh-scale.
Figure 7:
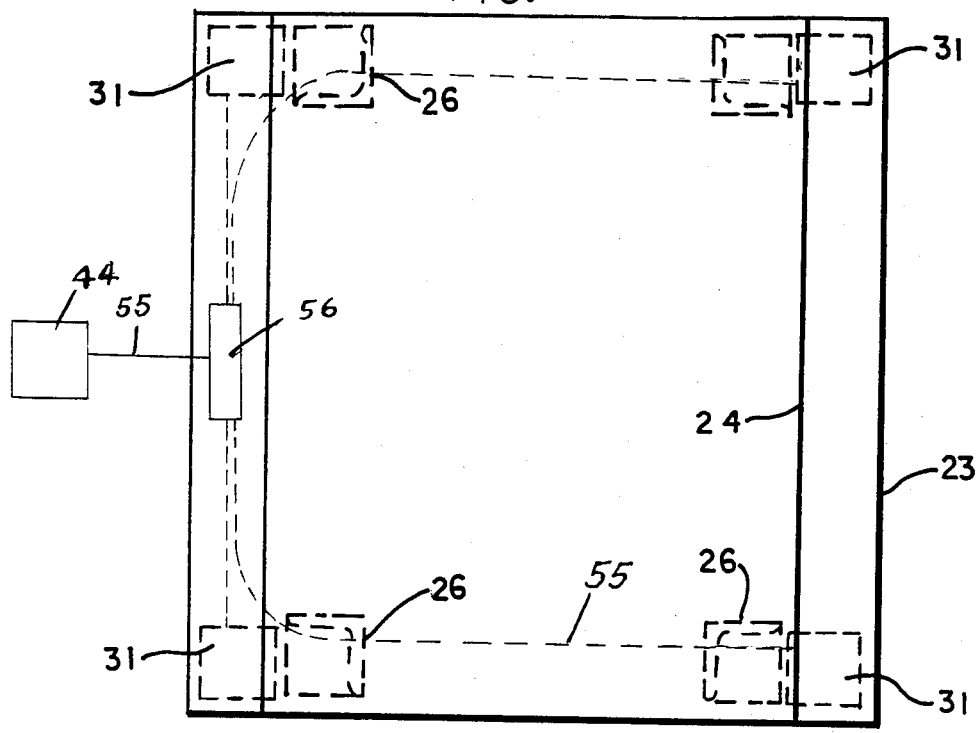
FIG. 7 is top view of the packer/weigh-scale according to the invention.
Figure 8:
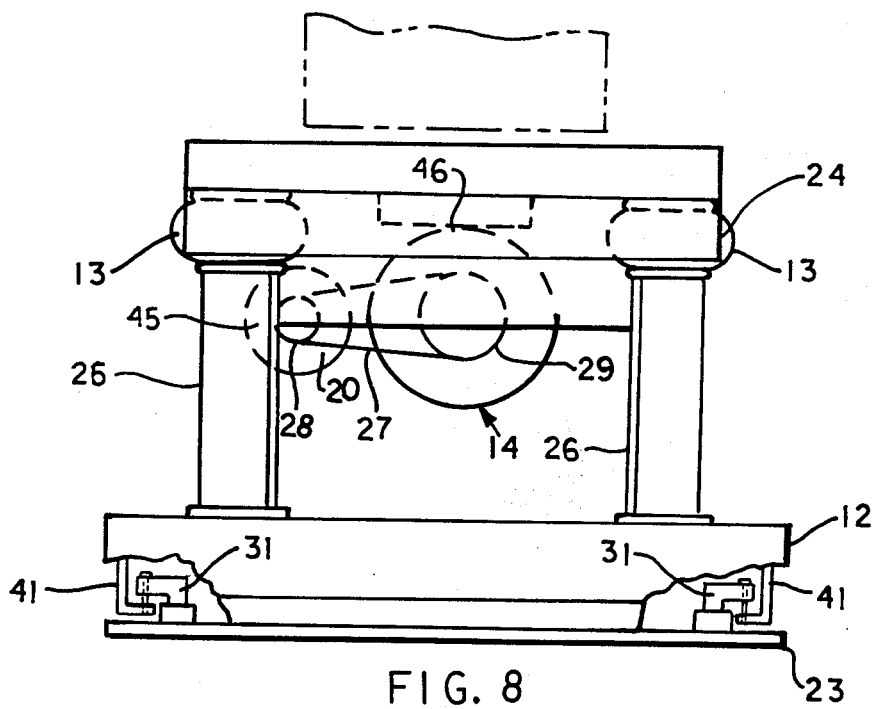
FIG. 8 is a side view of the packer/weigh-scale shown in FIG. 7 with parts broken away.

Now with more particular reference to the drawings, the packer/weigh-scale 10 disclosed is made up of a packer 11 and a weigh scale having a base 23 and a platform 12. The resilient supports 13 support the vibrator 14 of packer 11 on the weigh scale platform 12 through rigid vertical frame members 26. The vibrator 14 is supported on upper frame 24 at 46. The conveyor section 18 is also supported on the upper frame 24. A parts container 15 may be supported on the conveyor section 18. A feeder 16 is provided for feeding the parts to the containers 15. Readout 44 has an electronic indicator indicating the weight of the parts in the container 15. Readout 44 is electrically connected to load cells 31 by electrical cord 55 and junction box 56. The container 15 may be supported on the weigh scale platform 12 by a section 18 of a conveyor system 19 or by any other suitable support or conveyor system. The vibrator motor 20 is supported on the frame members at 45. Larger units may have the motor supported on the upper frame member along with the vibrator. Vertical frame supports 26 are fixed to platform 12 of the weigh scale. The vibrator 14 is driven by a motor 20 through a belt 27 and pulleys 28 and 29. The vibrator 14 is of the type shown in U.S. Pat. No. 3,499,337, which provides vibratory forces in one plane only.

The weigh scale is made up of a scale base 23, a platform 12 and four load cells 31. Load cells 31 are of a type of electronic load cells familiar to those skilled in the art to produce an electrical output proportionate to the load placed on the cell. The load cells 31 are disposed between the platform 12 and the base 23 and support the platform 12. The base 23 may rest on a suitable supporting surface.

Each load cell 31 is mechanically connected to a yoke 41 which is fixed to the platform 12. Yoke 41 is horizontal bar 38 which is mechanically connected to the load cell 31 by suspension member 30. The yoke 41 is welded to the scale platform 12 and supported on the arm 36 of the load cell by the flexible suspension member 30. The load is applied to the load cell 31 through the flexible suspension members 30 in such a manner that the force vector is directed downward. This is accomplished by the use of the flexible suspension members 30 or other suitable means. The flexible cable 32 of the suspension member 30 has a head 33 that extends through a bore in arm 36 of load cell 31. Flexible cable 32 has a rigid threaded section which extends through a hole in arm 38 and receives the nut 39. The vibrating force of vibrator 14 is directed in a vertical plane. By using a vibrator which gives a force in a vertical plane the force is directed either directly toward or directly away from the scale 12, thereby making a simpler operation.

The resilient supports 13, are shown by way of example as air bags, but could be springs or any other suitable support means to give a uniform resilient support for the upper frame 24, the conveyor section 18, the vibrator 14, and the product in container 15. Instead of air bags, helical or wound wire springs or solid rubber mounts or equivalent units could be used.

In an example of operation of the packer/weigh-scale the empty container may be brought down the conveyor 19 to the fill position 18 and stopped. The product introduced from feeder 16 and compacted by vibrator 14. The weight is monitored by readout 44 actuated by signal from load cell 31. Readout 44 could be an announciator which would signal the advance of the container 15 to the shipping position and indicate when the container is full.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows.

We claim:

1. A packer/weigh-scale made up of a scale platform, a vibrator attached to said scale platform adapted to vibrate said scale platform in a vertical plane only,
   an upper frame,
   resilient means supporting said an upper frame on said scale platform,
   a scale base,
   at least one load cell supported on said scale base,
   flexible tension means supporting said upper frame on said load cell whereby vibrations from said vibrator are transmitted to said scale in a vertical plane only, whereby material supported on said upper frame will be vibrated.

2. The packer/weigh-scale recited in claim 1 wherein said packer/weigh-scale comprises a sensing element and a readout means connected to said load cell.

3. The packer/weigh-scale recited in claim 2 wherein an arm is fixed to said load cell and extends laterally from said load cell,
   said flexible tension means comprises cable means attached to said arm and to said scale platform.

4. The packer/weigh-scale recited in claim 1 wherein a container and a section of track are supported on said platform,
   said track section being adapted to convey containers to be weighed to said weigh scale.

5. The packer/weigh-scale recited in claim 4 wherein said track is disposed in operative relation to other sections of track.

6. The packer/weigh-scale recited in claim 4 wherein said track comprises a roller conveyor.

7. The packer/weigh-scale recited in claim 1 wherein said scale platform is supported by at least four said load cells spaced from one another,
   each said load cell being connected to said readout means.

8. The packer/weigh-scale recited in claim 7 wherein each said load cell has a laterally extending arm attached thereto,
   said scale platform has yokes,
   one of said yokes being disposed above each said arm and extending downward and then laterally below said arm,
   a tension means is attached to each said arm and to a said yoke.

* * * * *

UNITED STATES PATENT AND TRADEMARK OFFICE
CERTIFICATE OF CORRECTION

PATENT NO. : 4,696,357
DATED : September 29, 1987
INVENTOR(S) : David E. Beehler, et. al.

It is certified that error appears in the above-indentified patent and that said Letters Patent is hereby corrected as shown below:

In column 4, line 2, please delete "scale platform" and insert —upper frame—.
In column 4, line 3, please delete "scale platform" and insert —upper frame—.
In column 4, line 4, please delete "scale platform" and insert —upper frame—.
In column 4, line 5, please delete "upper frame" and insert —a scale platform—.
In column 4, line 10, please delete "upper frame" and insert —scale platform—.
In column 4, line 12, please delete "scale" and insert —scale platform—.

Signed and Sealed this

Nineteenth Day of November, 1996

Attest:

BRUCE LEHMAN

*Attesting Officer*     *Commissioner of Patents and Trademarks*